(12) United States Patent
Mombers (10) Patent No.: US 11,586,580 B2
(45) Date of Patent: Feb. 21, 2023

(54) PARALLEL PROCESSOR OPTIMIZED FOR MACHINE LEARNING

(71) Applicant: Avago Technologies International Sales Pte. Limited, Singapore (SG)

(72) Inventor: Friederich Jean-Baptiste Mombers, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 17/370,995

(22) Filed: Jul. 8, 2021

(65) Prior Publication Data

US 2023/0008138 A1    Jan. 12, 2023

(51) Int. Cl.
*G06F 15/80* (2006.01)
*G06N 20/00* (2019.01)
*G06F 7/57* (2006.01)
*G06F 12/0842* (2016.01)

(52) U.S. Cl.
CPC ............ *G06F 15/8061* (2013.01); *G06F 7/57* (2013.01); *G06F 12/0842* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,608,625 B1 * | 8/2003 | Chin | G06T 15/80 345/519 |
| 2004/0252127 A1 * | 12/2004 | Linzer | H04N 19/423 375/E7.166 |
| 2008/0021586 A1 * | 1/2008 | Schillen | B33Y 30/00 700/120 |
| 2019/0188239 A1 * | 6/2019 | Serrano | G06F 9/38 |
| 2019/0340486 A1 * | 11/2019 | Mills | G06F 7/5443 |

OTHER PUBLICATIONS

Jamshidi, D. A. et al., D2MA: Accelerating Coarse-Grained Data Transfer for GPUs, 2014, ACM, pp. 431-442. (Year: 2014).*

* cited by examiner

*Primary Examiner* — Eric Coleman
(74) *Attorney, Agent, or Firm* — BakerHostetler (57) ABSTRACT

A parallel processor system for machine learning includes an arithmetic unit (ALU) array including several ALUs and a controller to provide instructions for the ALUs. The system further includes a direct-access memory (DMA) block containing multiple DMA engines to access an external memory to retrieve data. An input-stream buffer decouples the DMA block from the ALU array and provides aligning and reordering of the retrieved data. The DMA engines operate in parallel and include rasterization logic capable of performing a three-dimensional (3-D) rasterization.

20 Claims, 6 Drawing Sheets

PARALLEL PROCESSOR OPTIMIZED FOR MACHINE LEARNING

TECHNICAL FIELD

The present description relates generally to machine learning and, in particular, to a parallel processor optimized for machine learning.

BACKGROUND

Machine learning (ML) applications are commonly used to calculate overly large amounts of data, the processing of which can be mapped onto large parallel-programmable data-path processors. ML applications operate on multidimensional tensors (e.g., three and four dimensions). ML applications operate on simple integers, quantized integers (a subset of floating-point (FP) values tagged through integer numbers), FP 32 b and half-precision FP numbers (e.g., FP16 and brain floating point (BFLOAT) 16). An ML network may involve a mix of arithmetic operations, some as simple as adding two tensors, to more computation-intensive operations such as matrix multiplication and/or convolution or even very complex functions such as sigmoid, square root or exponentiation functions, for instance. ML applications also include tensor shape manipulation and can extract, compact, and reshape an input tensor into another output tensor, which implies intensive address calculation.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to systems and methods for optimizing a parallel processor for machine learning. The disclosed solution is based on a parallel processor with multiple layers of hardware (HW)-dedicated modules that are optimized to address the challenges involved in a mixture of arithmetic operations and tensor shape manipulations. The mixture of arithmetic operations may include adding two tensors or performing more computation-intensive operations such as matrix multiplication and/or convolution or even very complex functions such as sigmoid, square root or exponentiation functions, for instance. The tensor shape manipulation may include processing such as extracting, compacting and reshaping an input tensor into another output tensor, which implies intensive address calculation.

The parallel processor with multiple layers of HW-dedicated modules of subject technology can be part of a computer system. The functionality of such a computer system can be improved to allow performing a mixture of arithmetic operations including adding two tensors or performing more computation-intensive operations, as explained herein. It should be noted that performing these complex operations by an ML network can involve intensive address calculations, which are eliminated by the disclosed solution.

Figure 1:
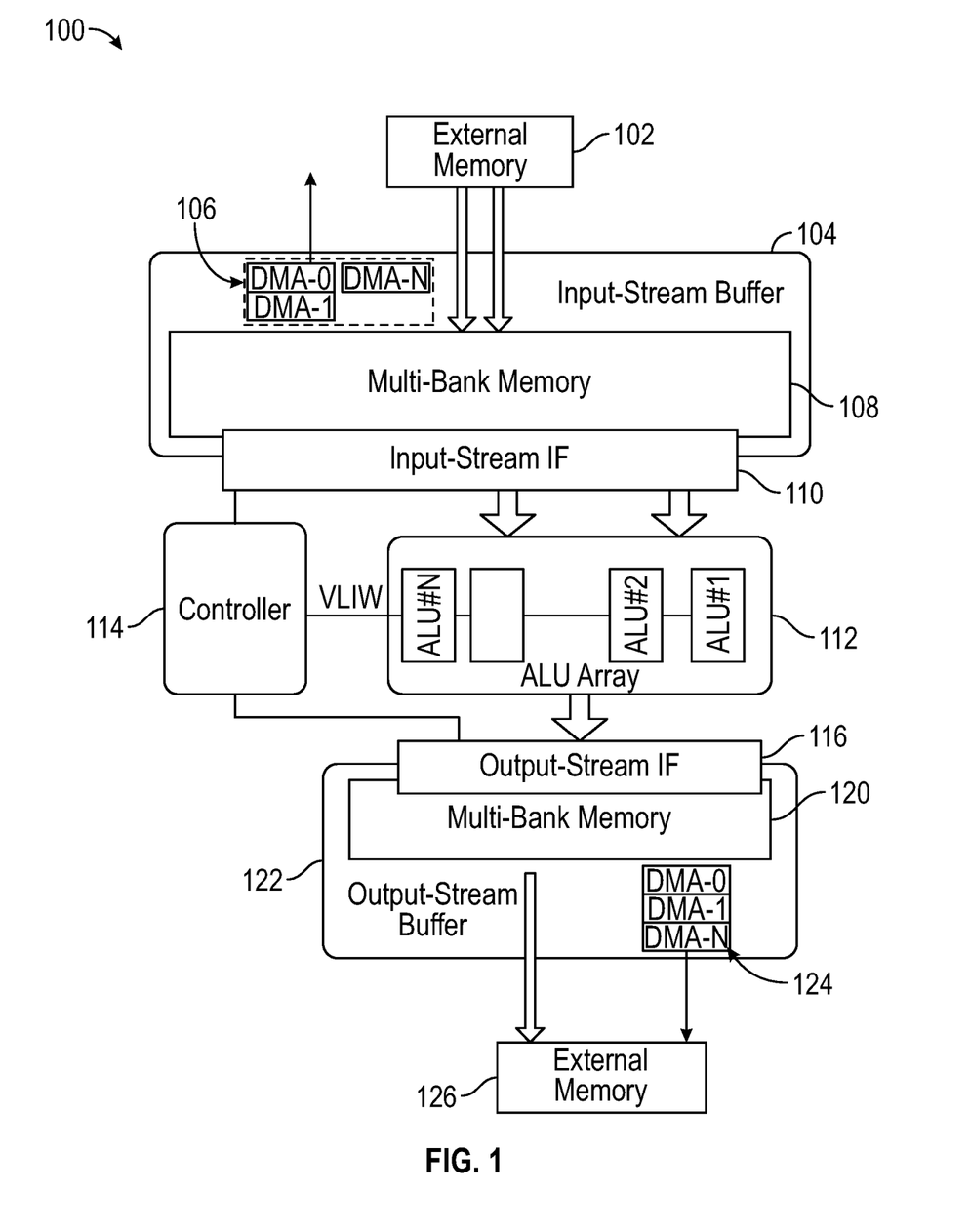
FIG. 1 is a high-level diagram illustrating an example of an architecture for optimizing a parallel processor system for machine learning, according to various aspects of the subject technology.

FIG. 1 is a high-level diagram illustrating an example of an architecture for optimizing a parallel-processor system 100 for machine learning, according to various aspects of the subject technology. The parallel-processor system 100 includes an input external memory 102, an input-stream buffer 104, an input multibank memory 108, an input-stream interface (IF) 110, an arithmetic logic unit (ALU) array 112, a controller unit 114, an output-stream IF 116, an output multibank memory 120, an output-stream buffer 122 including a set of output direct memory access (DMA) engines 124, and an output external memory 126.

The input-stream buffer 104 includes a set of input DMA engines 106. The input DMA engines 106 are powerful DMA engines capable of loading a segment full of tensor elements out of the external memory 102 and loading those into the input-stream buffer 104. The segment size can be as large as 32B or 64B in order to provide enough bandwidth to sustain the peak throughput of the processing engine (e.g., ALU array 112). There are multiple DMA engines (DMA-0 to DMA-N) that can operate in parallel to enable prefetching multiple pieces of tensors concurrently. The DMA engines 106 are equipped with sophisticated rasterizer logic so that the address calculation can be defined through a 7-tuple vector, basically allowing a 3-D raster pattern to be defined, as described in more detail herein.

The input-stream buffer 104 is built upon the input multibank memory 108 and basically serves two purposes. First, the input-stream buffer 104 can decouple the DMA engines 106 from the ALU array 112, which are digital signal-processing (DSP) engines, by bringing data ahead and absorbing data bubbles on the (shared) external memory interface by accepting multiple requests for data in advance. Second, the input-stream buffer 104 can provide data alignment and/or reordering so that the tensors' elements are nicely aligned to feed the N processing engines. In that regard, two basic orderings are implemented: direct and transposed storage.

In some implementations, the DMA engines 106 bring in data through a segment of constant M bytes and that corresponds to E=M/4 or M/2 or M elements depending on whether the input tensor is made of 32-bit floating point (fp 32), 32-bit integer (int 32), or half-float or quantized integer (8 bit) elements. The E elements are then stored into ALU array 112 depending on how they will be processed by the ALU array 112. In a direct mode, the E elements are stored in compact form into M/4 successive banks at the same address so that later on, by reading a single line crossing, the M/4 banks provide up to M elements to the DSP ALUs. One can see that a segment is being spread over the N DSP ALUs. In a transposed mode, the E elements are stored in a checkerboard pattern across K successive banks so that later on, when reading one line across the K banks, K elements from K different segments will be sent over the N ALU. As one can see, in this transposed mode, a given DSP ALU is executing all samples from a single segment. Depending on the processing to be executed on the input tensors, one can choose one mode or the other to allow adaptation of how the processing is distributed over N ALUs with the idea to maximize data processing parallelization and minimize inter-lane data exchange.

The set of output DMA engines 124 are identical to the set of input DMA engines 106 and can read the output stream buffer data to store lines into the output external memory 126 (e.g., random-access memory (RAM)). Again, the complex raster accessing (explained below) is available here as well to match the same addressing capabilities as exists in the input stage. In other words, the complex raster accessing can put back data in the same order and/or location.

The ALU array 112 includes a set of N DSP processing units (ALU #1 through ALU #N). The set of N DSP processing units, all operating in lockstep, are driven by the controller unit 114, which has its own program memory and can execute an instructions bundle made of M arithmetic instructions.

The output-stream IF, which does the same function as the input-stream IF but with reverse direction, i.e., it collects data out of the ALU array 112 and—after unfolding—places them in the output-stream buffer to be collected by the DMA engines. Similar to the input-stream IF 110 that acts as a pop interface for the ALU array 112, the output-stream IF 116 acts as a push interface for the output multibank memory 120. The output-stream buffer 122 mimics the same behavior as the input-stream buffer 104. It is based on a set of memory banks of the output multibank memory 120 that are used to absorb DMA latencies and are structured so that one can optionally deter the received elements. This allows scenarios such as (a) input transpose, DSP process and output transpose, so that the element order and/or shape is preserved; and (b) input transpose, DSP process, and output direct mode, in which case the element order and/or shape is not preserved and can be used for geometric transformation such as tensor transpose.

Figure 2:
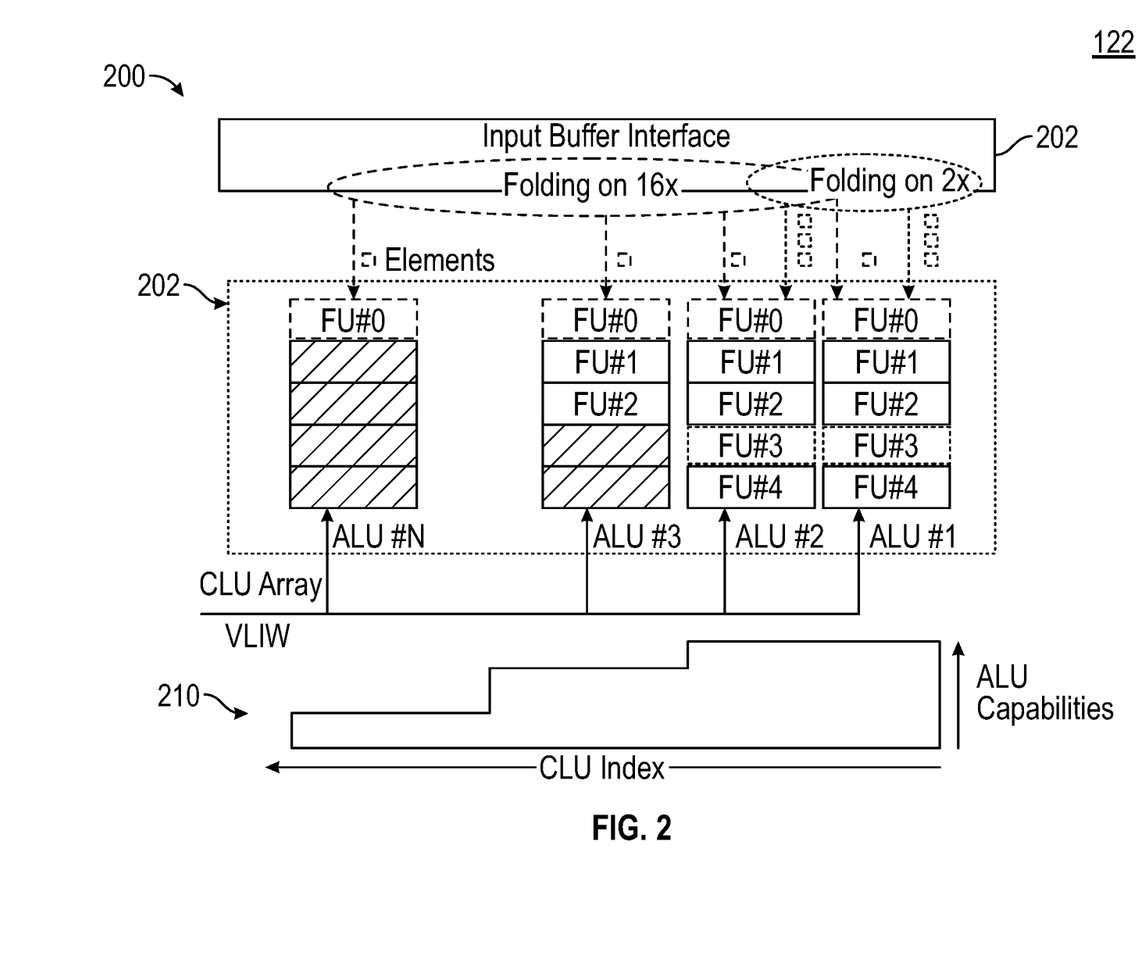
FIG. 2 is a schematic diagram illustrating an example of a set of heterogeneous arithmetic logic units (ALUs) fed through a folding interface, according to various aspects of the subject technology.

FIG. 2 is a schematic diagram illustrating an example architecture 200 of a set of heterogeneous ALU arrays 204 (hereinafter, ALU array 204) fed through a folding interface, according to various aspects of the subject technology. The example architecture 200 includes an input-buffer interface block 202 and the ALU array 204. The input-buffer interface block 202 is a fed-through folding interface and is similar to the input-stream IF 110 of FIG. 1. As described above, the input DMA engines 106 of FIG. 1 bring in data through a segment of constant M bytes that corresponds to E=M/4 or M/2 or M elements, which are then stored in the banks depending on how they will be processed by the DSP ALUs, which are the same as the ALU array 204.

The input-buffer interface block 202 lies between the input-stream buffer 104 of FIG. 1 and the ALU array 204. To retrieve elements from the input tensors, the ALU array 204 pops data from the input-stream buffer 104 through the input-buffer interface block 202, which abstracts the DSP engine to generate an address for each element being read. In addition, it regulates the buffer fullness and allows stalling the DSP whenever there is not enough data inside the input-stream buffer 104. The DSP load engine instructs the block how many elements out of the next segment it desires to read, and the block logic does all the bank address calculations accordingly if the storage is in direct or transposed mode.

An important function of the input-buffer interface block 202 is to manage segment-folding so that while a given segment might have E active elements, it can be read into successive multiple pieces of P elements by folding the E elements into P elements and distributing the P elements into the first P ALU out of the N ALU array 204. This folding mechanism is available in direct and transposed modes and will typically vary per tensor operation to match the ALU array 204 capabilities. The folding functions by basically squeezing the whole tensor through a window of P elements at a time over a number of cycles that depends on the total tensor size. A set of N ALUs of the ALU array 204 operates in lockstep and are driven by a controller unit (e.g., controller unit 114 of FIG. 1) that has its own program memory and executes an instructions bundle made of M arithmetic instructions.

The instructions bundle goes to all the N ALUs but at any time only a subset of the N ALUs can be enabled to execute the broadcasted instructions. Note that there is no explicit load/store instruction needed; instead, the N ALUs can access directly each DMA channel through the input-buffer interface block 202 as a direct input to an operation. The same thing can apply for the store, where the output of an operation can be chosen to be an output stream. Each ALU contains additional storage through local register files so that intermediate calculation results can be stored.

The ALU capabilities are shown in a bar chart 210, illustrating that going from ALU #1 to ALU #N the ALU capabilities decrease. For example, ALU #1 and ALU #2 each include five functional units (FUs), ALU #3 includes three FUs and ALU #N has only one FU. As evident from the ALU bar chart 210, not all ALUs need to be identical: instead, they are clustered into multiple groups of equivalent ALUs in each FU, where each group's capability is a superset of the previous group. So, on one extreme side, one finds a group made of relatively simple ALUs with only integer capabilities and that operate mostly on 8-bit quantities with little local storage. On the other extreme side, one finds another set of ALUs that are extremely powerful and cover all data types, have large register files and implement complex nonlinear functions; in between one will find other clusters of ALUs with more or less capabilities (i.e., integer and half-float support only). This partitioning is efficient for two reasons: (1) it allows for balancing total area and processing performance depending on the type of operations by allocating more or less of the full fledged ALUs; and (2) it allows balancing memory bandwidth and compute bandwidth (i.e., a few 32-bit floating point-capable ALUs and many more 8-bit ALUs for the same total input/output bandwidth). There are a few key aspects behind this arrangement. While the set of N ALUs of the ALU array 204 is indeed heterogeneous, it is still controlled by a single instructions bundle that goes to all ALUs, and ALUs only execute the instructions that they support. Another key aspect of this arrangement is the folding capabilities of the input-buffer interface block 202, which allows tensor elements to be efficiently mapped solely onto the ALUs that are capable of performing the required operation. The basic set of operations/instructions supported by the ALU is an example of what can be found in DSP instruction set architecture (ISA), but is also augmented with special instructions dedicated for ML application. Notably, specific instructions are available to perform (a) quantized zero-point conversion; i.e., converting an 8-bit quantized integer into a 32-bit integer $(X-Zp) \times Sc$ can be efficiently executed in one clock cycle (and its inverse operation); (b) nonlinear activation functions (e.g., relu, sigmoid, tanh) can be efficiently executed in one clock cycle; and (c) supporting brain floating-point 16 (BFLOAT 16) data as well as FP16 and FP32.

Figure 3:
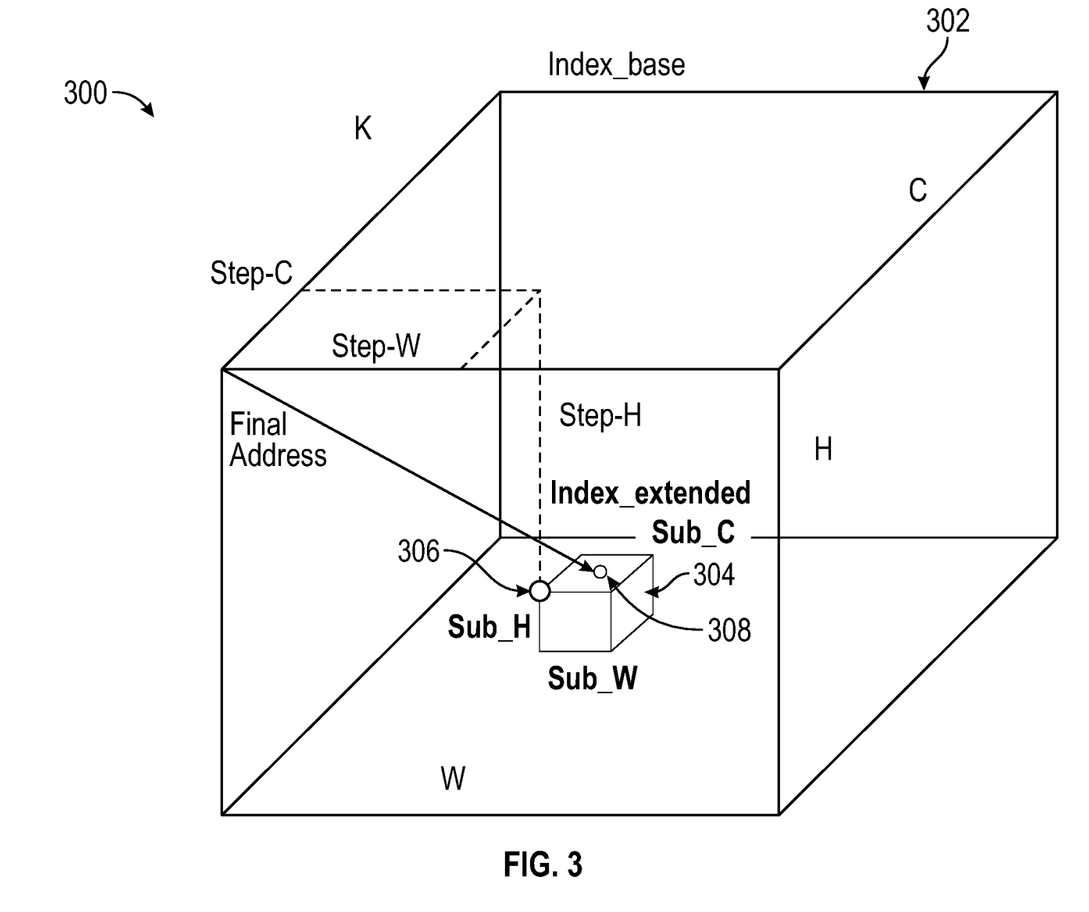
FIG. 3 is a schematic diagram illustrating an example of rasterization capabilities of direct memory access (DMA) for generating complex address patterns, according to various aspects of the subject technology.

FIG. 3 is a schematic diagram illustrating an example of rasterization capabilities of DMA for generating complex address patterns, according to various aspects of the subject technology. The DMA engines 106 of FIG. 1 are equipped with sophisticated rasterizer logic so that the address calculation can be defined through a 7-tuple vector. This can basically allow a 3-D raster pattern as defined through [1, sub_H, sub_W, sub_C] stepping inside a 4-D tensor defined through [K, H, W, C] of a cube 304. The stepping can happen every clock cycle to prefetch multiple pieces of tensors concurrently. By correctly parameterizing the seven-dimension steps it is possible to create powerful zig-zagging scanning patterns, which are required for some tensor shape manipulation operations to provide an ordered access within the 4-D tensor. A combination (through simple coordinate addition) of the 3-D and 4-D coordinates generates a final 4-D coordinate, which is used to address the external memory and bring a segment full of tensor element. To provide enough bandwidth to the DSP core, two DMA engines can access in parallel the external memory and bring two segments per cycle into the input stream buffer. While a rough rasterization represented by the cube 302 can result in a rough sample location 306 within the memory, an independent fine rasterization represented by the cube 304 starting from the rough sample location 306 can resolve an optimum location 308 of a sample, which can be a desired memory element address. The rough and fine rasterizations are independent of each other; for example, the rough rasterization can start scanning along the C dimension and the fine rasterization may start by scanning along the H dimension first.

Figure 4:
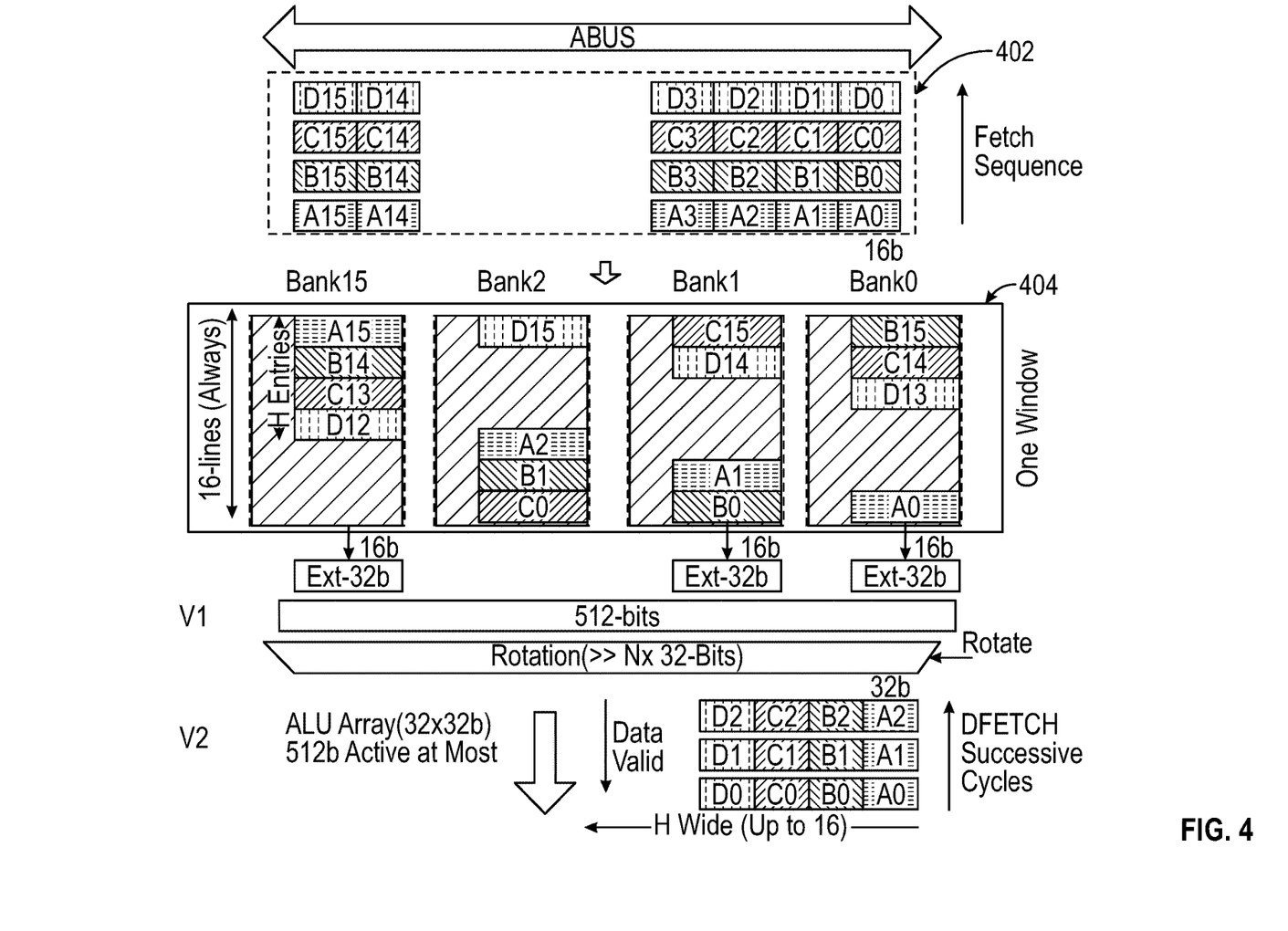
FIG. 4 is a schematic diagram illustrating an example of a technique for transposition through a stream buffer, according to various aspects of the subject technology.

FIG. 4 is a schematic diagram illustrating an example of a technique for transposition through a stream buffer, according to various aspects of the subject technology. As explained above, in a transposed mode, E elements are stored in a checkerboard pattern across K (e.g., 16) successive banks 404 so that later on, when reading one line across the K successive banks 404, K elements from K different segments (bank0 through bank15) will be sent over the N ALU. As one can see, in this transposed mode a given DSP ALU is executing all samples from a single segment. The transposition of FIG. 4 is to illustrate the case of E=16 (i.e., Half-float) and the way data are stored into the input-stream buffer 104 of FIG. 1, when configured in transposed mode. The checkerboard pattern allows writing one input segment into 16 banks (e.g., bank0 through bank15) and when reading to broadcast four segments onto four ALUs during 16 cycles. Thanks to this arrangement it is possible to do elements transposition with a single write/read memory. This is essential for ML applications, which at different times may require different access orders of data. At one time the ALU needs to access the data 402 in one order, and some other times it needs to access the data 402 in a different order. For example, in the transposition of FIG. 4, A0, B0 and C0 data are accessed in parallel in a first cycle, A1 and B1 data in a second cycle, A2 and D12 data in a third cycle, and so on.

Figure 5:
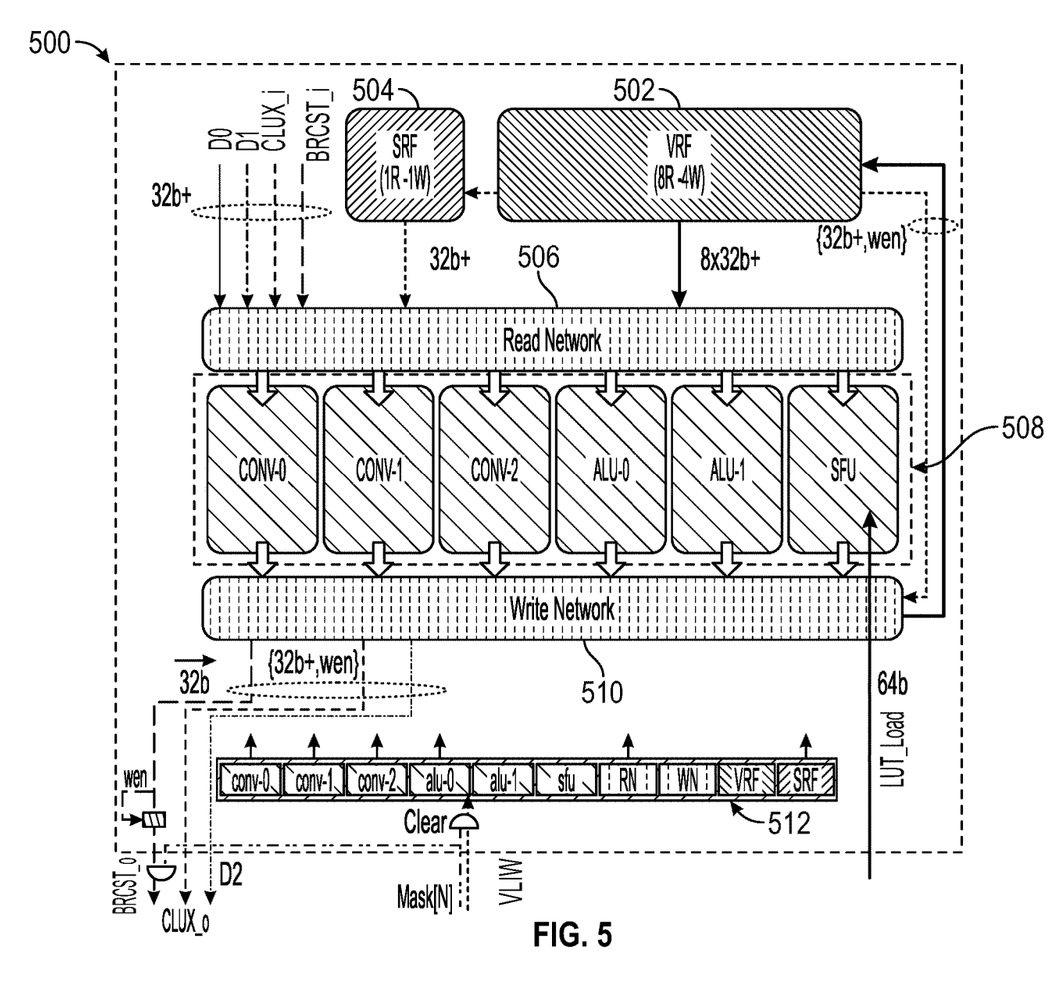
FIG. 5 is a schematic diagram illustrating an example of an architecture of a complex ALU, according to various aspects of the subject technology.

FIG. 5 is a schematic diagram illustrating an example of an architecture of a complex ALU 500, according to various aspects of the subject technology. The complex ALU 500 includes a vector register file (VRF) 502, a scalar register file (SRF) 504, a read network (RN) 506, a set of complex ALUs 508, a write network (WN) 510, and an instruction register 512. The VRF 502 and the SRF 504 are used to store vectoral and scalar variables, respectively, as both of them may be used in ML applications. D0 and D1 provide data from the input stage. The RN 506 transfers data to appropriate functional units of the complex ALUs 508, which include a special function unit (SFU), ALU-0, ALU-1, converter logic-0 (CONV-0), CONV-1 and CONV-2. The instruction register 512 is a long instruction register and includes instructions for CONV-0, CONV-1, CONV-2, ALU-0, ALU-1 and SFU functional units of the complex ALUs 508, as well as for the RN 506, WN 510, VRF 502 and SRF 504. The instruction register 512 stores a very long instruction word (VLIW) provided by the controller unit 114 of FIG. 1. The WN 510 is responsible for writing the processed data into the output-stream IF 116 of FIG. 1.

Figure 6:
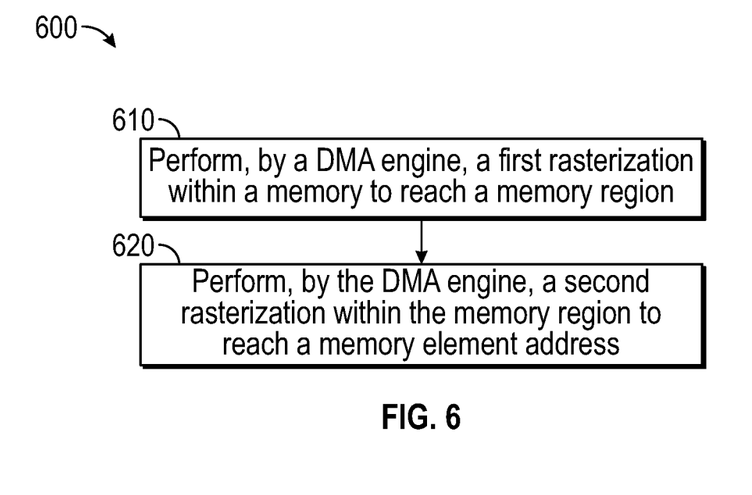
FIG. 6 is a flow diagram illustrating an example of a method for orderly accessing a memory by a DMA engine, according to various aspects of the subject technology.

FIG. 6 is a flow diagram illustrating an example of a method 600 for orderly accessing a memory by a DMA engine, according to various aspects of the subject technology. The method 600 includes performing, by a DMA engine (e.g., 106 of FIG. 1), a first rasterization within a memory (e.g., 102 of FIG. 1) to reach a memory region (e.g., 306 of FIG. 3) (610), and performing, by the DMA engine, a second rasterization within the memory region to reach a memory element address (e.g., 308 of FIG. 3) (620). The first rasterization is performed by defining a 3-D raster pattern via a quadruple-vector address calculation within a first cube (e.g., 302 of FIG. 3), and the second rasterization is performed via a triple-vector address calculation within a second cube (e.g., 304 of FIG. 3) around the memory region to reach the memory element address (e.g., 308 of FIG. 3).

Those of skill in the art would appreciate that the various illustrative blocks, modules, elements, components, memory systems, and algorithms described herein may be implemented as electronic hardware, computer software, or a combination of both. To illustrate this interchangeability of hardware and software, various illustrative blocks, modules, elements, components, memory systems, and algorithms have been described above generally in terms of their functionalities. Whether such functionalities are implemented as hardware or software depends upon the particular application and design constraints imposed on the overall system. Skilled artisans may implement the described functionalities in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that not all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people.

The predicate words "configured to" do not imply any particular tangible or intangible modification of a subject. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "the aspect," "some implementations," "one or more implementations," "the embodiment," "the subject technology," and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples.

Any embodiment described herein as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a memory system claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A parallel processor system for machine learning, the system comprising:
    an arithmetic logic unit (ALU) array;
    a controller configured to provide instructions for the ALU array;
    a plurality of direct memory access (DMA) engines configured to access an external memory to retrieve data; and
    an input-stream buffer configured to decouple the plurality of DMA engines from the ALU array and provide aligning and reordering of the retrieved data,
    wherein the plurality of DMA engines are configured to operate in parallel and include logic configured to perform a rasterization via a 7-tuple vector scanning.

2. The system of claim 1, wherein the input-stream buffer is further configured to absorb data bubbles on a shared interface of the external memory by accepting multiple requests for data.

3. The system of claim 1, wherein the instructions comprise a very long instruction word (VLIW) including instructions for the ALU array and for vector and scalar registers.

4. The system of claim 1, wherein the logic comprises rasterization logic configured to perform three-dimensional (3-D) rasterization.

5. The system of claim 4, wherein the 7-tuple vector scanning comprises performing a rough rasterization via a quadruple-vector address calculation within a first cube to reach a memory region.

6. The system of claim 5, wherein the 7-tuple vector scanning further comprises performing a fine rasterization via a triple-vector address calculation within a second cube around the memory region to reach a memory element address.

7. The system of claim 1, wherein the ALU array comprises a plurality of ALUs that include a different number of functional units with different computational capabilities.

8. The system of claim 7, further comprising an input-buffer interface configured to perform feed-through folding to feed each of the plurality of ALUs based on corresponding functional units and computational capabilities of each ALU of the plurality of ALUs.

9. The system of claim 1, wherein the retrieved data are fed into the ALU array in one of a direct mode or a transposed mode.

10. The system of claim 9, wherein in the transposed mode the retrieved data are staggered in a pattern in the ALU array.

11. The system of claim 1, further comprising a vector register file (VRF) module and a scalar register file (SRF) module configured to store vectoral and scalar variables, respectively.

12. The system of claim 11, wherein the ALU array comprise different functional units including at least converter-logic ALUs and special-function ALUs, and wherein the VRF module and the SRF module are configured to feed a vectoral or scalar variable through a read network into an ALU of the ALU array based on a corresponding functional units of that ALU.

13. A method comprising:
performing, by a DMA engine, a first rasterization within a memory to reach a memory region; and
performing, by the DMA engine, a second rasterization within the memory region to reach a memory element address,
wherein:
the first rasterization is performed by defining a 3-D raster pattern via a quadruple-vector address calculation within a first cube, and
the second rasterization is performed via a triple-vector address calculation within a second cube around the memory region to reach the memory element address.

14. The method of claim 13, wherein defining a 3-D raster pattern comprises performing a quadruple-vector address calculation by stepping inside a four-dimensional (4-D) tensor defined through dimensions [K, H, W, C] of the first cube.

15. The method of claim 14, further comprising using the first rasterization to provide an ordered access within the 4-D tensor.

16. The method of claim 15, wherein the ordered access starts from scanning any of dimensions H, W and C of the first cube.

17. A system comprising:
an input-stream buffer including a plurality of direct memory access (DMA) engines configured to access an external memory to retrieve data;
an arithmetic logic unit (ALU) array; and
an input-buffer interface configured to perform feed-through folding to feed the ALU array based on corresponding functional units and computational capabilities of the ALU array,
wherein:
the input-stream buffer is configured to decouple the plurality of DMA engines from the ALU array, and
the plurality of DMA engines are configured to operate in parallel and include rasterization logic configured to perform a 3-D rasterization.

18. The system of claim 17, further comprising a controller configured to provide instructions for the ALU array, wherein the instructions comprise a VLIW including instructions for the ALU array and for vector and scalar registers.

19. The system of claim 17, wherein the input-stream buffer is configured to:
provide aligning and reordering of the retrieved data, and
absorb data bubbles on a shared interface of the external memory by accepting multiple requests for data.

20. The system of claim 17, wherein the plurality of DMA engines are configured to operate in parallel to enable prefetching tensors concurrently.

* * * * *

UNITED STATES PATENT AND TRADEMARK OFFICE
CERTIFICATE OF CORRECTION

PATENT NO. : 11,586,580 B2
APPLICATION NO. : 17/370995
DATED : February 21, 2023
INVENTOR(S) : Friederich Jean-Baptiste Mombers It is certified that error appears in the above-identified patent and that said Letters Patent is hereby corrected as shown below:

In the Claims

Column 8, Line 66 Claim 12 delete "a" after "based on".

Signed and Sealed this
Eighteenth Day of April, 2023

Katherine Kelly Vidal
*Director of the United States Patent and Trademark Office*